United States Patent
Tsukada (10) Patent No.: US 9,581,122 B2
(45) Date of Patent: Feb. 28, 2017

(54) STOP CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Yuta Tsukada, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/774,057

(22) PCT Filed: Apr. 1, 2013

(86) PCT No.: PCT/JP2013/059970
§ 371 (c)(1),
(2) Date: Sep. 9, 2015

(87) PCT Pub. No.: WO2014/162471
PCT Pub. Date: Oct. 9, 2014

(65) Prior Publication Data
US 2016/0017856 A1    Jan. 21, 2016

(51) Int. Cl.
*B60W 10/08* (2006.01)
*B60L 11/14* (2006.01)
(Continued)

(52) U.S. Cl.
CPC ........... *F02N 11/0818* (2013.01); *B60K 6/445* (2013.01); *B60L 11/126* (2013.01); *B60L 11/14* (2013.01);
(Continued)

(58) Field of Classification Search
CPC .... F02N 11/0818; B60W 20/00; B60W 20/40; B60W 10/06; B60W 10/08; B60W 2510/084; B60W 2510/0685; B60L 11/14; B60L 11/126; B60L 2270/145; B60L 2240/423; B60L 2240/443; B60K 6/445; Y02T 10/642; Y02T 10/6239; Y02T 10/6286; Y02T 10/6217; Y02T 10/7077
(Continued)

(56) References Cited

U.S. PATENT DOCUMENTS 6,832,148 B1 * 12/2004 Bennett .................. B60K 6/445
180/65.225
7,653,478 B2 * 1/2010 Park ........................ B60K 6/48
123/179.4
(Continued)

FOREIGN PATENT DOCUMENTS

JP          11-82094 A     3/1999
JP          4161645 B      3/2004
(Continued)

OTHER PUBLICATIONS

English abstract of JP Application No. 2010-173557 (disclosed with machine translation on Sep. 9, 2015).

*Primary Examiner* — Hieu T Vo
*Assistant Examiner* — Arnold Castro
(74) *Attorney, Agent, or Firm* — Andrews Kurth Kenyon LLP (57) ABSTRACT

A stop control apparatus is applied to an internal combustion engine (11) whose crankshaft (11*a*) is connected to an input shaft (15) via a torsional damper (14), wherein the direction in which the crankshaft (11*a*) rotates while the operation of the internal combustion engine (11) is assumed to be the positively rotating direction, and a state of the torsional angle of the torsional damper (14) when the crankshaft (11*a*) is advancing in the positively rotating direction with respect to the input shaft (15) is assumed to be positive. When a predetermined engine stop condition is satisfied, a stop control for outputting torque from a first MG (12) such that the crankshaft (11*a*) decelerates is executed. The timing at which the torque is output from the first MG (12) is
(Continued)

controlled such that the positive peak of the torsional angle of the torsional damper (14) occurs in the expansion stroke of the internal combustion engine (11).

3 Claims, 8 Drawing Sheets

(51) Int. Cl.
  *B60W 10/06* (2006.01)
  *B60W 20/00* (2016.01)
  *F02N 11/08* (2006.01)
  *B60K 6/445* (2007.10)
  *B60L 11/12* (2006.01)
(52) U.S. Cl.
  CPC ............. *B60W 10/06* (2013.01); *B60W 10/08* (2013.01); *B60W 20/00* (2013.01); *B60W 20/40* (2013.01); *B60L 2240/423* (2013.01); *B60L 2240/443* (2013.01); *B60L 2270/145* (2013.01); *B60W 2510/0685* (2013.01); *B60W 2510/084* (2013.01); *Y02T 10/6217* (2013.01); *Y02T 10/6239* (2013.01); *Y02T 10/6286* (2013.01); *Y02T 10/642* (2013.01); *Y02T 10/7077* (2013.01)

(58) Field of Classification Search
  USPC ...................................................... 123/179.4
  See application file for complete search history.

(56) References Cited

U.S. PATENT DOCUMENTS

| 8,316,810 | B2* | 11/2012 | Holz | .................... | B60W 10/06 |
| | | | | | 123/179.4 |
| 2015/0051817 | A1* | 2/2015 | Murata | .................... | B60K 6/48 |
| | | | | | 701/112 |
| 2015/0158484 | A1* | 6/2015 | Sato | ........................ | B60K 6/445 |
| | | | | | 701/22 |

FOREIGN PATENT DOCUMENTS

| JP | 2009-274627 A | 11/2009 |
| JP | 2010-173557 A | 8/2010 |
| JP | 2012-218696 A | 11/2012 |

\* cited by examiner

STOP CONTROL APPARATUS FOR INTERNAL COMBUSTION ENGINE

CROSS-REFERENCE TO RELATED APPLICATIONS

The present application is a U.S. National Phase of International Patent Application No. PCT/JP2013/059970, filed on Apr. 1, 2013, which is hereby expressly incorporated herein in its entirety by reference thereto.

TECHNICAL FIELD

The present invention relates to a stop control apparatus applied to an internal combustion engine whose crankshaft is connected to a rotational member via a torsional damper.

BACKGROUND ART

There is known an apparatus which reduces torque fluctuation of an internal combustion engine by making torque fluctuation which is antiphase with respect to torque fluctuation of an internal combustion engine by a generator motor (see Patent Literature 1). According to the apparatus of the Patent Literature 1, the connection and the shut off between a crankshaft and a sub-flywheel is controlled and phase matching is performed between the torque fluctuation of the internal combustion engine and the torque fluctuation of the generator motor, and thereby, it is possible to enhance the effect of reduction of the torque fluctuation. Further, as prior art documents relating to the present invention, there are Patent Literatures 2 and 3.

CITATION LIST

Patent Literature

PTL1: JP H11-082094 A
PTL2: JP 4161645 B
PTL3: JP 2012-218696 A

SUMMARY OF INVENTION

Technical Problem

In the apparatus of the Patent Literature 1, when battery charge is restricted, there is a possibility that the antiphase torque fluctuation is impossible to be generated by the generator motor. Therefore, in such a case, it is impossible to suppress appropriately the torque fluctuation of the internal combustion engine in the apparatus of the Patent Literature 1.

Then, the present invention aims to provide a stop control apparatus of an internal combustion engine capable of reducing vibration and abnormal noise at the moment when the internal combustion engine is made to stop by a method different from a conventional method.

Solution to Problem

A first stop control as one aspect of the present invention is a stop control apparatus applied to an internal combustion engine, a crankshaft of the internal combustion engine being connected to a rotational member via a torsional damper, wherein when a direction in which the crankshaft rotates while the internal combustion engine is in operation is assumed to be a positively rotating direction, and a state of a torsional angle of the torsional damper in a state of the crankshaft advancing in the positively rotating direction with respect to the rotational member is assumed to be positive, a last positive peak of torque of the internal combustion engine occurs when the internal combustion engine is going to be stopped occurs in a situation where a rotational speed of the internal combustion engine is lower than resonant frequency of the torsional damper, and the stop control apparatus comprises: an electric motor which is capable of outputting torque to the crankshaft; and a stop device which is configured to execute a stop control to make the electric motor output the torque such that the crankshaft decelerates, in a case where a predetermined engine stop condition is satisfied, wherein the stop device is configured to stop the crankshaft such that a positive peak of the torsional angle of the torsional damper occurs in an expansion stroke of the internal combustion engine.

As well known, in the expansion stroke, torque to drive the crankshaft in the positively rotating direction is applied to the crankshaft. On the other hand, the torsional damper, after the torsional angel reaches the positive peak, starts twisting in the negative rotating direction opposite to the positive rotating direction. Due to this, torque directed to the negative rotating direction occurs at the torsional damper. In the first stop control apparatus of the present invention, the positive peak of the torsional angle of the torsional damper is made to occur in the expansion stroke. Thereby, it is possible to weaken the torque generated at the torsional damper by the torque of the internal combustion engine. Accordingly, it is possible to suppress the torsional vibration of the torsional damper. In this way, since it is possible to decrease the vibrations of the crankshaft and the rotational member, it is possible to decrease vibrations when the internal combustion engine is going to be stopped. Also, by decrease of such vibrations in this way, it is possible to decrease abnormal noise.

A second control apparatus as another aspect of the present invention is a stop control apparatus applied to an internal combustion engine, a crankshaft of the internal combustion engine being connected to a rotational member via a torsional damper, wherein when a direction in which the crankshaft rotates while the internal combustion engine is in operation is assumed to be a positively rotating direction, a state of torque applied to the crank shaft in the positively rotating direction in which the crankshaft rotates is assumed to be positive, and a state of a torsional angle of the torsional damper in a state of the crankshaft advancing in the positively rotating direction with respect to the rotational member is assumed to be positive, a last positive peak of torque of the internal combustion engine occurs when the internal combustion engine is going to be stopped occurs in a situation where a rotational speed of the internal combustion engine is higher than resonant frequency of the torsional damper, and the stop control apparatus comprises: an electric motor which is capable of outputting torque to the crankshaft; and a stop device which is configured to execute a stop control to make the electric motor output the torque such that the crankshaft decelerates, in a case where a predetermined engine stop condition is satisfied, wherein the stop device is configured to stop the crankshaft such that a negative peak of the torsional angle of the torsional damper occurs in an expansion stroke of the internal combustion engine.

In a situation where the rotational speed of the internal combustion engine is higher than the resonant frequency of the torsional damper, even if the torque of the internal combustion engine is inputted to the torsional damper, the torsional damper cannot follow the torque inputted. Due to this, the effect of the inputted torque occurs on the torsional vibration of the torsional damper in a delayed fashion. In the second stop control apparatus of the present invention, the last positive peak of the torque of the internal combustion engine occurs in a situation where the rotational speed of the internal combustion engine is higher than the resonant frequency of the torsional damper. Due to this, in the situation where the rotational damper of the internal combustion engine is higher than the resonant frequency, the torque of the internal combustion engine is inputted to the torsional damper. According to the second stop control apparatus, the negative peak of the torsioanal angle of the torsional damper is made to occur in the expansion stroke of the internal combustion engine. In this way, by inputting torque of the internal combustion engine in consideration of follow performance of the torsional damper, similarly to the first stop control apparatus it is possible to weaken the torque generated at the torsional damper by the torque of the internal combustion engine. Thereby, it is possible to suppress the torsional vibration of the torsional damper. Accordingly, it is possible to decrease abnormal noise when the internal combustion engine is going to be stopped.

As one embodiment of the first or second stop control apparatus of the present invention, the stop device may be configured to start the stop control in a case where the rotational speed of the internal combustion engine is a predetermined determination rotational speed or lower and also a crank angle of the internal combustion engine is within a predetermined determination range. In this way, by controlling the timing to start the stop control based on both of the rotational speed of the internal combustion engine and the crank angle, it is possible to control a phase of the torsional vibration of the torsional damper and a phase of the torque pulsation of the internal combustion engine respectively.

BRIEF DESCRIPTION OF DRAWINGS

FIG. 1 is a diagram schematically showing a hybrid vehicle where mounted is an internal combustion engine which a stop control apparatus according to a first embodiment of the present invention is built in.

DESCRIPTION OF EMBODIMENTS

First Embodiment

Figure 1:
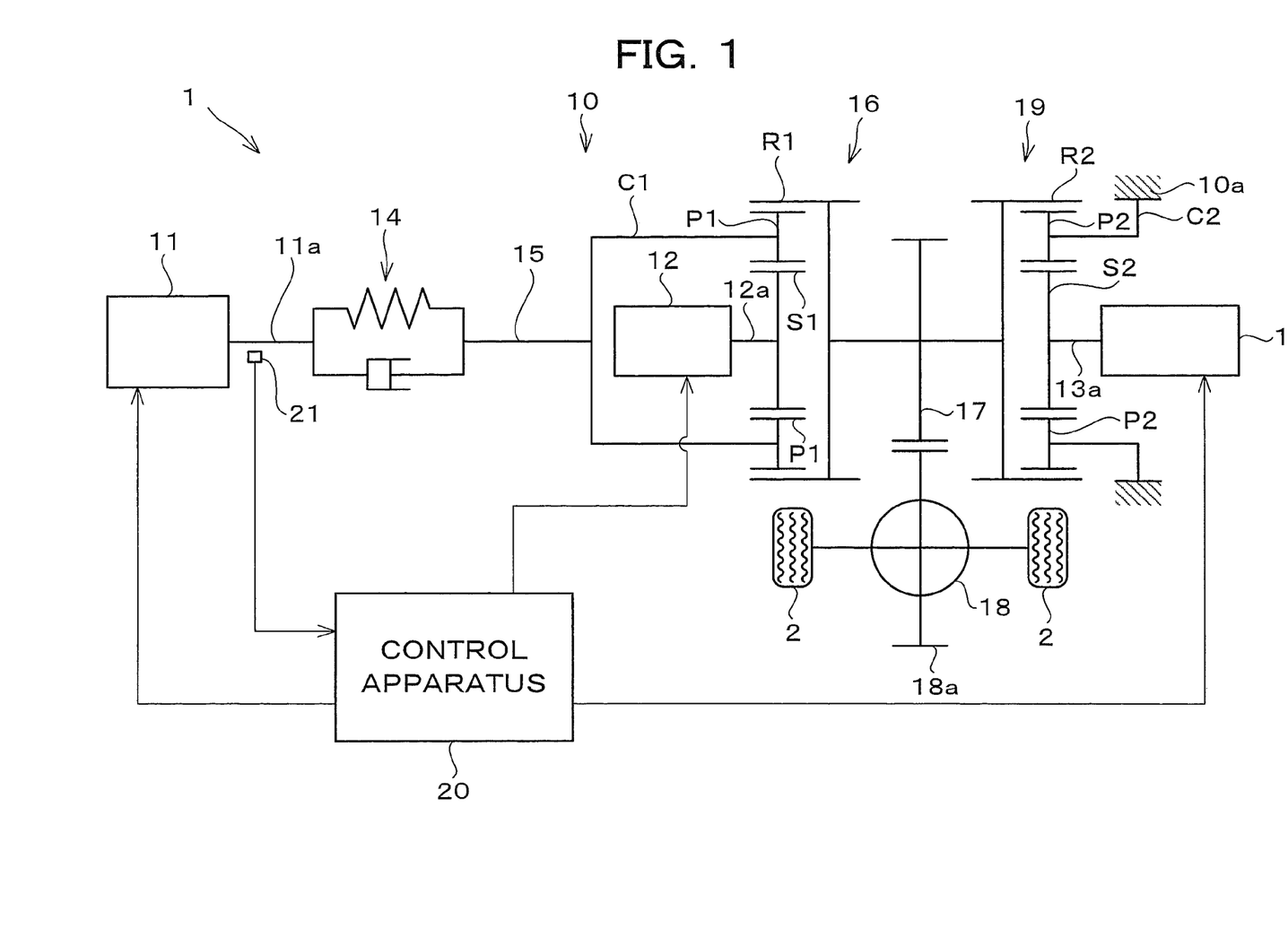

There will be described a stop control apparatus according to a first embodiment of the present invention in reference to FIGS. 1 to 4. FIG. 1 schematically shows a hybrid vehicle 1. As shown in this figure, a drive apparatus 10 of the hybrid vehicle 1 comprises: an internal combustion engine (hereinafter, sometimes referred to as an engine.) 11; a first motor generator (hereinafter, sometimes referred to as a first MG) 12; and a second motor generator (hereinafter, sometimes referred to as a second MG) 13. The engine 11 is configured as an in-line 4-cylinder internal combustion engine. Since the engine 11 is a well-known one which is mounted to a vehicle, a detailed explanation will be omitted. Each of the first MG 12 and the second MG 13 is a well-known motor generator which functions as an electric motor and a power generator.

A crankshaft 11a of the engine 11 is connected to a power splitting device 16 via a torsional damper (hereinafter, abbreviated as the damper) 14 and an input shaft 15. Therefore, the input shaft 15 corresponds to the rotational member of the present invention. The damper 14 is a well-known damper designed so as to allow elastic torsion. Therefore, a detailed explanation will be omitted. A rotor shaft 12a of the first MG 12 is also connected to the power splitting device 16.

The power splitting device 16 is designed as a single pinion type planetary gear mechanism. The power splitting device 16 comprises: a sun gear S1 which is an external gear; a ring gear R1 which is an internal gear arranged coaxially with the sun gear S1; and a carrier C1 holding pinion gears P1 rotatably and revolvably around the sun gear S1, the pinion gears P1 engaging with the mentioned gears S1 and R1. The sun gear S1 is connected to the rotor shaft 12a of the first MG 12 so as to rotate integrally with the rotor shaft 12a. The carrier C1 is connected to the input shaft 15 so as to rotate integrally with the input shaft 15. The ring gear R1 is connected to an output gear 17 so as to rotate integrally with the output gear 17. The output gear 17 engages with a ring gear 18a provided in a case of the differential mechanism 18. The differential mechanism 18 is a well-known mechanism which distributes power transmitted to the ring gear 18a into right and left drive wheels 2.

A rotor shaft 13a of the second MG 13 is connected to the output gear 17 via a deceleration mechanism 19. The deceleration mechanism 19 is designed as a single pinion type planetary gear mechanism. The deceleration mechanism 19 comprises: a sun gear S2 which is an external gear; a ring gear R2 which is an internal gear arranged coaxially with the sun gear S2; and a carrier C2 holding pinion gears P2 rotatably and revolvably around the sun gear S2, the pinion gears P2 engaging with the mentioned gears S2 and R2. The sun gear S2 is connected to the rotor shaft 13a of the second MG 13 so as to rotate integrally with the rotor shaft 13a. The carrier C2 is fixed to a case 10a of the drive apparatus 10 so as not to rotate. The ring gear R2 is connected to the output gear 17 so as to rotate integrally with the output gear 17.

Operations of the engine 11, the first MG 12 and the second MG 13 are controlled by a control apparatus 20. The control apparatus 20 is configured as a computer unit including a micro processor and peripherals necessary for operations of the microprocessor such as a RAM and a ROM. The control apparatus 20 holds various kinds of control programs for making the vehicle 1 travel appropriately. By executing these control programs, the control apparatus 20 controls control objects such as the engine 11 and the MGs 12 and 13. To the control apparatus 20, connected are various kinds of sensors for obtaining information with respect to the vehicle 1. To the control apparatus 20, a crank angle sensor 21 is connected, for example. The crank angle sensor 21 outputs a signal corresponding to an angle of the crankshaft 11a (a crank angle). Further various kinds of sensors and switches are connected to the control apparatus 20. However, the illustrations thereof will be omitted.

The control apparatus 20 stops the engine 11 in a case where a predetermined engine stop condition has been satisfied while the engine 11 is in operation. The vehicle 1 is provided with a plurality of kinds of traveling modes. As the plurality of kinds of traveling modes, provided are an EV traveling mode where the drive wheels 2 are driven only by the second MG 13, an engine traveling mode where the drive wheels 2 are driven mainly by the engine 11, and the like. In the vehicle 1, at the moment of start-up and low speed traveling, the traveling mode is changed to the EV traveling mode. It is determined that the engine stop condition has been satisfied, in a case where the vehicle 1 has stopped, a vehicle speed has reached a predetermined determination speed or lower, or the like.

When being going to stop the engine 11, the control apparatus 20 executes a stop control to output torque from the first MG 12 after stopping a fuel supply to the engine 11 in order to reduce the rotational speed of the crankshaft 11a. Thereby, the control apparatus 20 stops the engine 11 smoothly. At this moment, the damper 14 is twisted because of a difference between the rotational speed of the engine 11 and the rotational speed of the input shaft 15, and torsional vibration occurs at the damper 14. The control apparatus 20 controls a relation between a phase of torque pulsation of the engine 11 and a phase of torsional vibration of the damper 14 so as to reduce the torsional vibration of the damper 14 by the torque pulsation of the engine 11.

Figure 2:
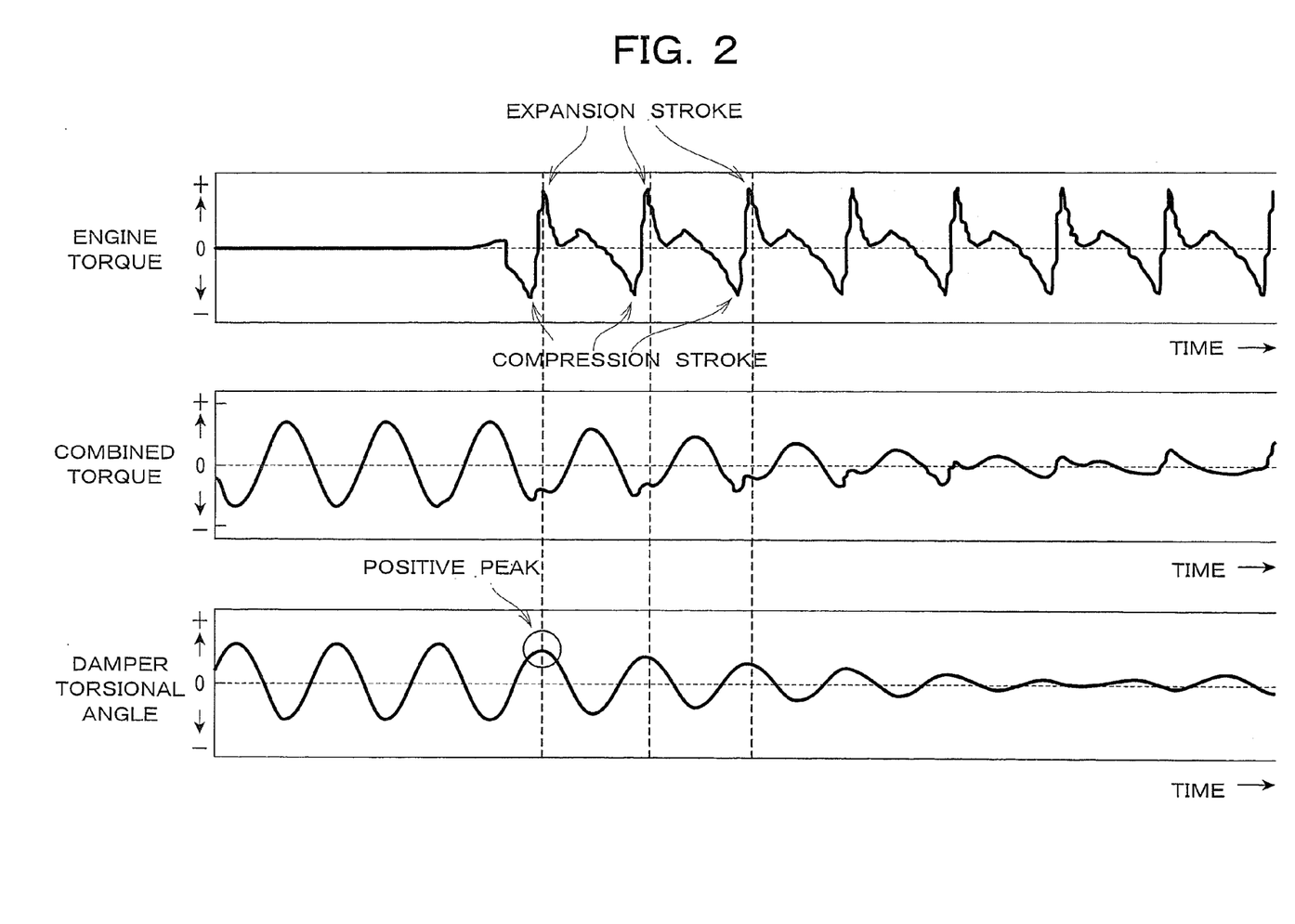
FIG. 2 is a diagram showing an example of changes over time with respect to torque of engine, combined torque obtained by combining the torque of engine and torque generated by resilience of a damper, and a torsional angle of the damper.

A method for reducing the torsional vibration will be described in reference to FIG. 2. FIG. 2 shows one example of changes over time with respect to torque Te of the engine 11, combined torque Te+Tdamp obtained by combining the torque Te of the engine 11 and torque Tdamp generated by resilience of the damper 14, and a torsional angle α of the damper 14. In the present invention, a rotational direction at the moment when the engine 11 is in operation is assumed to be a positively rotating direction, and an opposite direction of the positively rotating direction is assumed to be a negatively rotating direction. Positively rotating torque is assumed to be a positive torque, and negatively rotating torque is assumed to be a negative torque. With respect to the torsional angle α, a state when the damper 14 is not twisted is assumed to be a criterion, that is, 0°. A state where the crankshaft 11a is advancing in the positively rotating direction with respect to the input shaft 15 is assumed to be positive. Therefore, a state where the input shaft 15 is advancing in the positively rotating direction with respect to the crankshaft 11a is assumed to be negative.

In each cylinder of the engine 11, an intake stroke, a compression stroke, an expansion stroke and an exhaust stroke are executed repeatedly in order. As well known, in the compression stroke, since gas in the cylinder is compressed by a piston, negative torque is applied to the crankshaft 11a. On the other hand, in the expansion stroke, since compressed gas presses the piston, positive torque is applied to the crankshaft 11a. In the intake stroke and in the exhaust stroke, at least one of an intake valve and an exhaust valve is opened. Therefore, In theses strokes, little torque is applied to the crankshaft 11a. As mentioned above, the expansion stroke is the next stroke of the compression stroke. Therefore, as shown in this figure, the torque Te of the engine 11 decreases gradually and reaches a negative peak. Immediately after that, the stroke is changed from the compression stroke to the expansion stroke and the torque Te reaches a positive peak. After the positive peak, the torque Te decreases gradually and reaches again the negative peak. The torque Te changes repeatedly in this way. In the first embodiment, when the engine 11 is going to stop, the last positive peak of the torque pulsation of the engine 11 occurs in a situation where the rotational speed of the engine 11 is lower than the resonant frequency of the damper 14.

The torsional angle α of the damper 14 changes such that a positive peak and a negative peak occur alternatively in a constant period, as shown in this figure. This frequency is determined depending on specifics of the damper 14a, for example, a spring constant of the damper 14 and the like.

The present invention controls the relation between the phase of the torque pulsation of the engine 11 and the phase of the torsional vibration of the damper 14 such that the positive peak of the torsional angle α of the damper 14 occurs in the expansion stroke as shown in this figure. As shown in this figure, the torsional angle α changes to the negative side after reaching the positive peak. That is, after the torsional angle α reaches the positive peak, the damper 14 starts to twist in the negatively rotating direction. In this case, the damper 14 twists so as to run late for the rotation of the crankshaft 11a. Therefore, the torque Tdamp caused by the resilience of the damper 14 is a negative torque. On the contrary, in the expansion stroke, the crankshaft 11a is driven to rotate in the positively rotating direction. Therefore, as mentioned above, the positive torque is applied to the crankshaft 11a. Accordingly, as shown in this figure, the combined torque Te+Tdamp obtained by combining these torques is made smaller. Due to this, the torsional vibration of the damper 14 is suppressed.

The control apparatus 20 control timing to start the stop control, that is, timing to make the first MG 12 output torque such that the relation between the phase of the torque pulsation of the engine 11 and the torque of the torsional vibration of the damper 14 meets such a relation. Concretely, the control apparatus 20 starts the stop control, in a case where the rotational speed of the engine 11 is a predetermined determination rotational speed or lower and also the crank angle is within a predetermined determination range. The determination rotational speed is set to, for example, an idling rotational speed. The determination range is set, such that the positive peak of the torsional angle α of the damper 14 occurs in the expansion stroke if the stop control is started from the crank angle within this range. The torsional vibration of the damper 14 and the time of the expansion stroke of the engine 11 are determined various matters of the engine 11 and the various matters of the damper 14. Then, the determination range may be determined as appropriate depending on such various matters. Further, the determination range may be determined by experiments, numerical calculations or the like.

Figure 3:
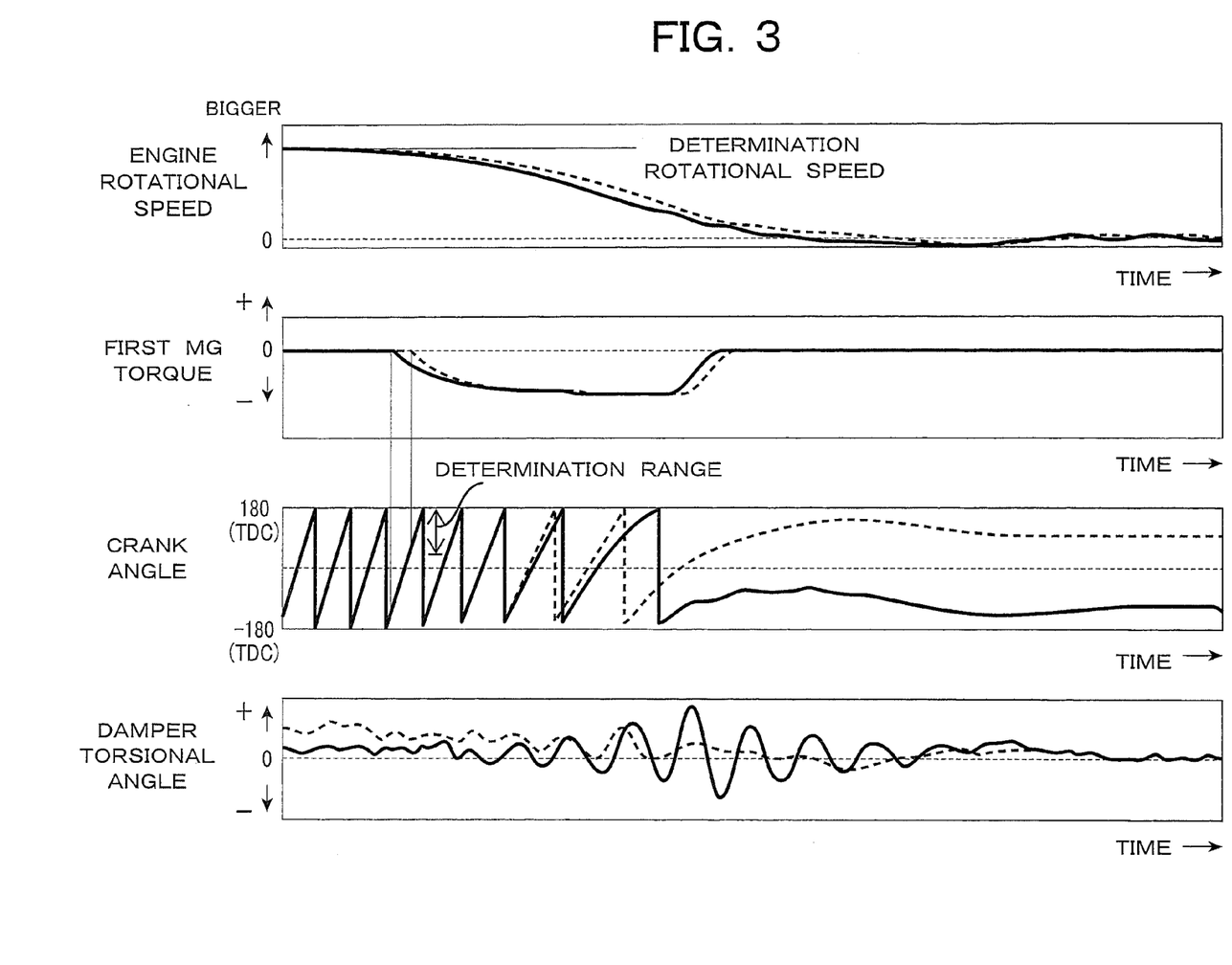
FIG. 3 is a diagram showing an example of changes over time with respect to a rotational speed of engine, torque of a first MG, crank angle, and the torsional angle of the damper, when the engine is going to be stopped.

FIG. 3 shows changes over time in a situation where the start time of the stop control is controlled in the above way, with respect to the rotational speed of the engine 11, the torque of the first MG 12, the crank angle, and the torsional angle α of the damper 14. Each broken line in this figure shows the change in a situation where the start time is controlled. Further, with respect to the rotational speed of the engine 11, the torque of the first MG 12, the crank angle, and the torsional angle α of the damper 14, as a comparative example, other changes over time in a situation where the stop control is started when the crank angle is without the determination range are also shown in this figure. Each solid line in this figure shows the comparative example.

As apparent from this figure, in a case that the stop control is started in a situation where the rotational speed of the engine 11 is the determination rotational speed or lower and also the crank angle is within the determination range, it is possible to make the fluctuation of the torsional angle α of the damper 14 smaller. On the other hand, in a case where the stop control is started in a situation where the crank angle is without the determination range like the comparative example, the fluctuation of the torsional angle α of the damper 14 is amplified immediately before the stop of the crankshaft 11a.

Figure 4:
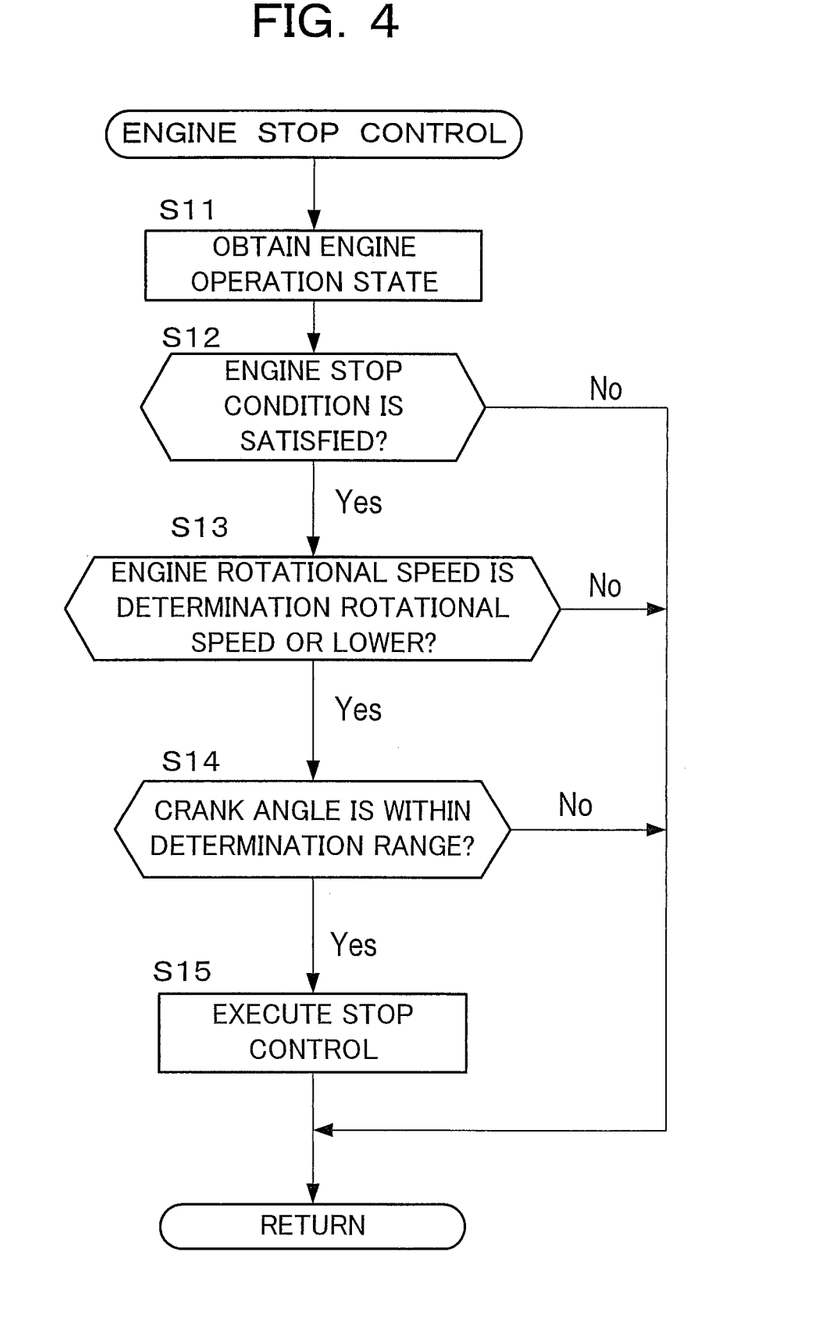
FIG. 4 is a flow chart showing a engine stop control routine executed by a control apparatus.

FIG. 4 shows an engine stop control routine executed by the control apparatus 20 for reducing the torsional vibration of the damper 14 in this way. This control routine is executed repeatedly in a predetermined period while the engine 11 is in operate. The control apparatus 20 functions as the stop device of the present invention by executing this control routine.

In this control routine, first, the control apparatus 20 obtains an operating state of the engine 11 at step S11. As the operating state of the engine 11, the crank angle, the rotational speed of the crankshaft 11a, and the like are obtained. The rotational speed of the crankshaft 11a may be obtained based on the output signal from the crank angle sensor 21.

At the next step S12, the control apparatus 20 determines whether or not the predetermined engine stop condition for stopping the engine 11 has been satisfied. As mentioned above, it is determined that the engine stop condition has been satisfied, in a case where the vehicle 1 has stopped, the vehicle speed has reached the predetermined determination speed or lower, or the like. In a case where it is determined that the engine stop condition is not satisfied, the control apparatus 20 ends the control routine of this time.

On the other hand, in a case where the control apparatus 20 determines that the engine stop condition has been established, the control apparatus 20 goes to step S13 to determine whether the rotational speed of the engine 11 is the determination rotational speed or lower. In a case where the control apparatus 20 determines that the rotational speed of the engine 11 is higher than the determination rotational speed, the control apparatus 20 ends the control routine of this time. On the other hand, in a case where the control apparatus 20 determines that the rotational speed of the engine 11 is the determination rotational speed or lower, the control apparatus 20 goes to step S14 to determine whether or not the crank angle is within the determination range. In a case where the control apparatus 20 determines that the crank angle is without the determination range, the control apparatus 20 ends the control routine of this time.

On the other hand, in a case where the control apparatus 20 determines that the crank angle is within the determination range, the control apparatus 20 goes to step S15 to execute the stop control. Thereby, the torque is output from the first MG 12 to start reducing the rotational speed of the crankshaft 11a. After that, the control apparatus 20 ends the control routine of this time.

As explained above, according to the first embodiment, since the timing to make the first MG 12 output torque is controlled such that the positive peak of the torsional angle α of the damper 14 occurs in the expansion stroke, it is possible to suppress the torsional vibration of the damper 14. Thereby, it is possible to decrease the vibrations of the crankshaft 11a and the input shaft 15 when the engine 11 is going to be stopped. Further, due to this, it is possible to suppress occurrence of a tooth striking noise caused by vibration of the gears of the power splitting device 16. Thereby, it is possible to decrease abnormal noises. Further, in the first embodiment, since the torsional vibration of the damper 14 is suppressed by using the torque pulsation of the engine 11, it is possible to suppress energy to be consumed for the suppress of the tortional vibration.

In the first embodiment, in a case where the negative peak of the torsional angle α of the damper 14 occurs in the expansion stroke, the torsional vibration of the damper 14 is amplified. As shown in FIG. 2, the torsional angle α changes to the positive state after reaching the negative peak. In this case, the damper 14 is twisted in the positively rotating direction. That is, the damper 14 is twisted so as to advance with respect to the rotation of the crank 11a. Due to this, the torque Tdamp caused by the resilience of the damper 14 is the positive torque. Then, in the expansion stroke, positive torque is applied to the crank shaft 11a. Accordingly, these torques strengthen each other, and the combined torque Te+Tdamp is made bigger. Thereby, the torsional vibration of the damper 14 is amplified. Then, in the present embodiment, the timing to make the first MG 12 output torque may be controlled such that the negative peak of the torsional angle α of the damper 14 does not occur in the expansion stroke. Thereby, at least, it is possible to avoid amplifying the torsional vibration of the damper 14. This control may be executed, in a case where the control apparatus 20 failed to control the timing to make the first MG 12 output torque such that the positive peak of the torsional angle α of the damper 14 occurs in the expansion stroke.

Second Embodiment

A stop control apparatus according to a second embodiment of the present invention will be described in reference to FIGS. 5 to 8. Also in the present embodiment, FIG. 1 is used when referring to the vehicle 1. Further, in the present embodiment, same referential symbols are assigned to shared portions with the first embodiment, and the explanations of the shared portions are omitted.

Figure 5:
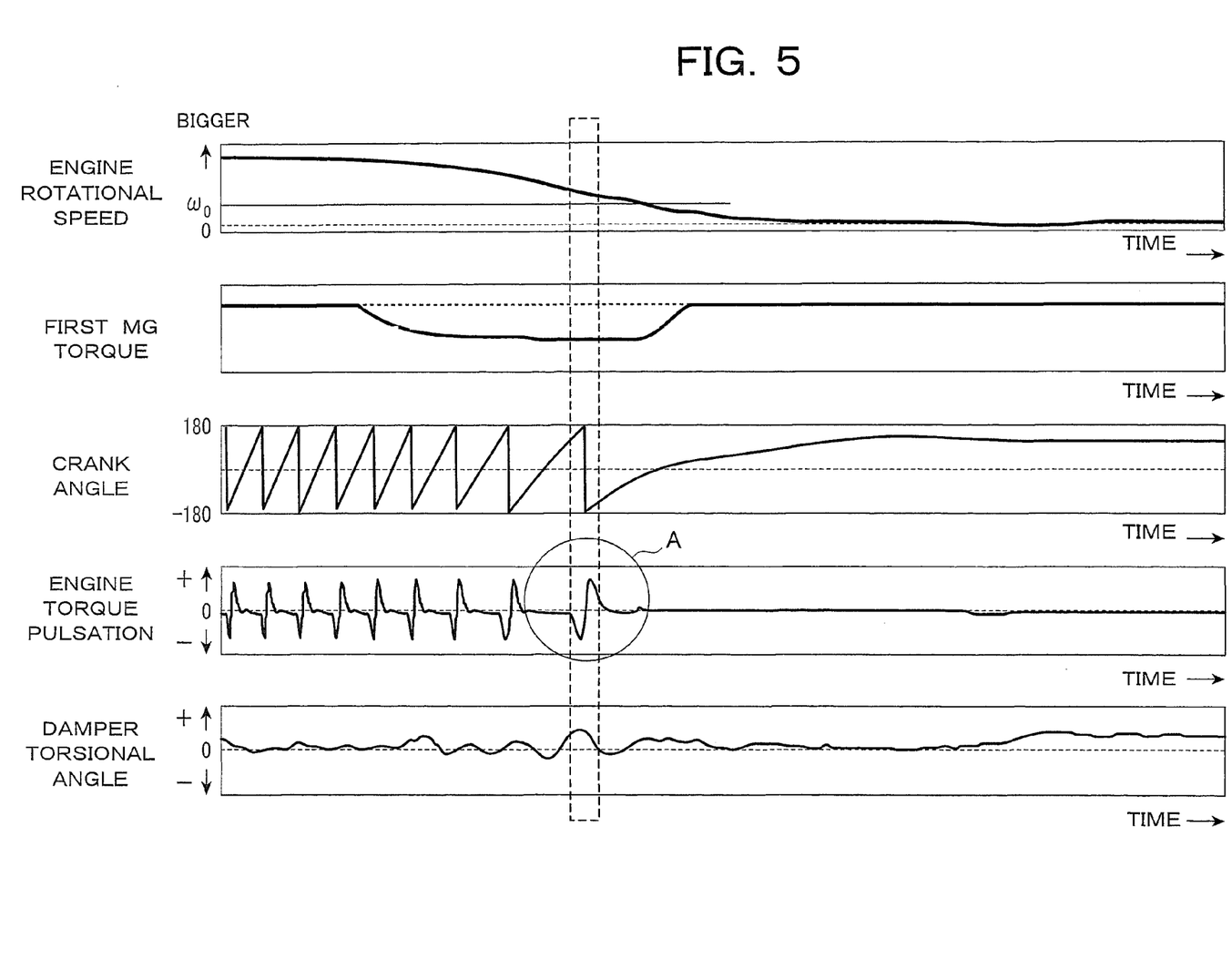
FIG. 5 is a diagram showing an example of changes over time with respect to a rotational speed of engine, torque of the first MG, the crank angle, pulsation of the engine, and the torsional angle of the damper, when the internal combustion engine which a stop control apparatus according to a second embodiment of the present invention is built in is going to be stopped.

FIG. 5 shows an example of changes over time when the engine 11 of the present embodiment is going to be stopped, with respect to the rotational speed of the engine 11, the torque of the first MG 12, the crank angle, the torque pulsation of the engine 11, and the torsional angle α of the damper 14. The "ω0" in this figure indicates the resonant frequency of the damper 14. As shown in this figure, in the present embodiment, when the engine 11 is going to be stopped, the last positive peak of the torque pulsation of the engine 11 occurs in a situation where the rotational speed of the engine 11 is higher than the resonant frequency ω0 of the damper 14. The peak in a circle A of this figure is the last positive peak. As mentioned above, in the first embodiment, the last positive peak of the torque pulsation of the engine 11 occurs in the situation where the rotational speed of the engine 11 is lower than the resonant frequency ω0 of the damper 14.

The torsional angle α of the damper 14 can be calculated by the following formula (1). "Te" of this formura indicates the torque of the engine 11. "ω0" indicates the resonant frequency of the damper 14. "ω" indicates the rotational speed of the engine 11. "t" indicates time.

(Formula 1)

$$\text{Damper torsional angle} = \frac{Te}{\omega_0^2 - \omega^2}(\sin\omega t - \sin\omega_0 t) \quad (1)$$

Figure 6:
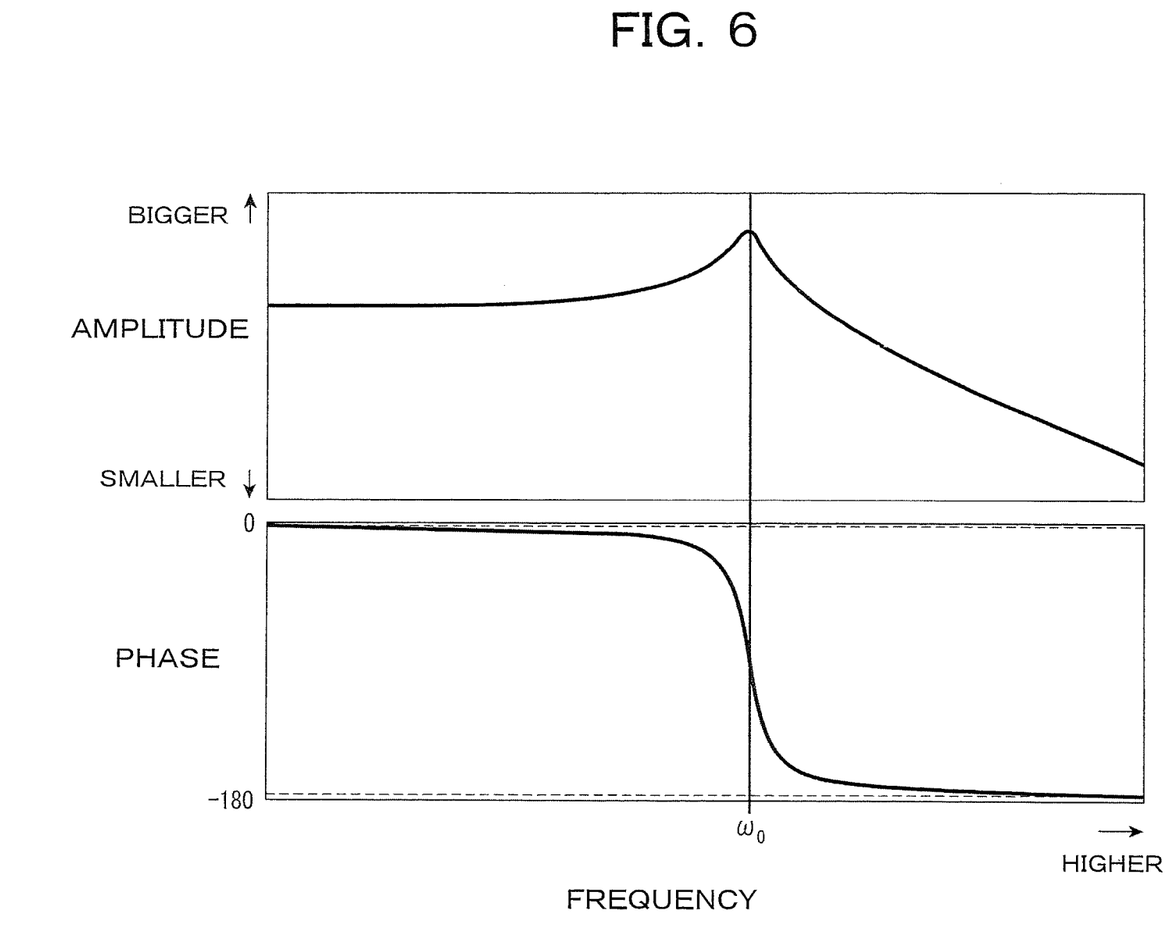
FIG. 6 is a bode plot in a situation where a formula for calculating the torsional angle of the damper is set as a transfer function, the torque of engine is set as input, and the torsional angle of the damper is set as output.

FIG. 6 shows a bode plot obtained by setting the formula (1) as a transfer function. In the bode plot, the torque Te of the engine 11 is set as input, and the torsional angle α of the damper 14 is set as output. The horizontal axis of this figure is a logarithmic scale. As apparent from this figure, the phase becomes 0° at the frequency higher than the resonant frequency ω0, and becomes −180° at the frequency lower than the resonant frequency ω0. That is, the phase inverts over the resonant frequency ω0. Due to this, when the frequency of the torque of the engine 11 which is inputted to the damper 14 is higher than the resonant frequency $\omega_0$, the damper 14 cannot follow the torque inputted, and the effect of the torque inputted occurs on the torsional vibration of the damper 14 in a delayed fashion.

Figure 7:
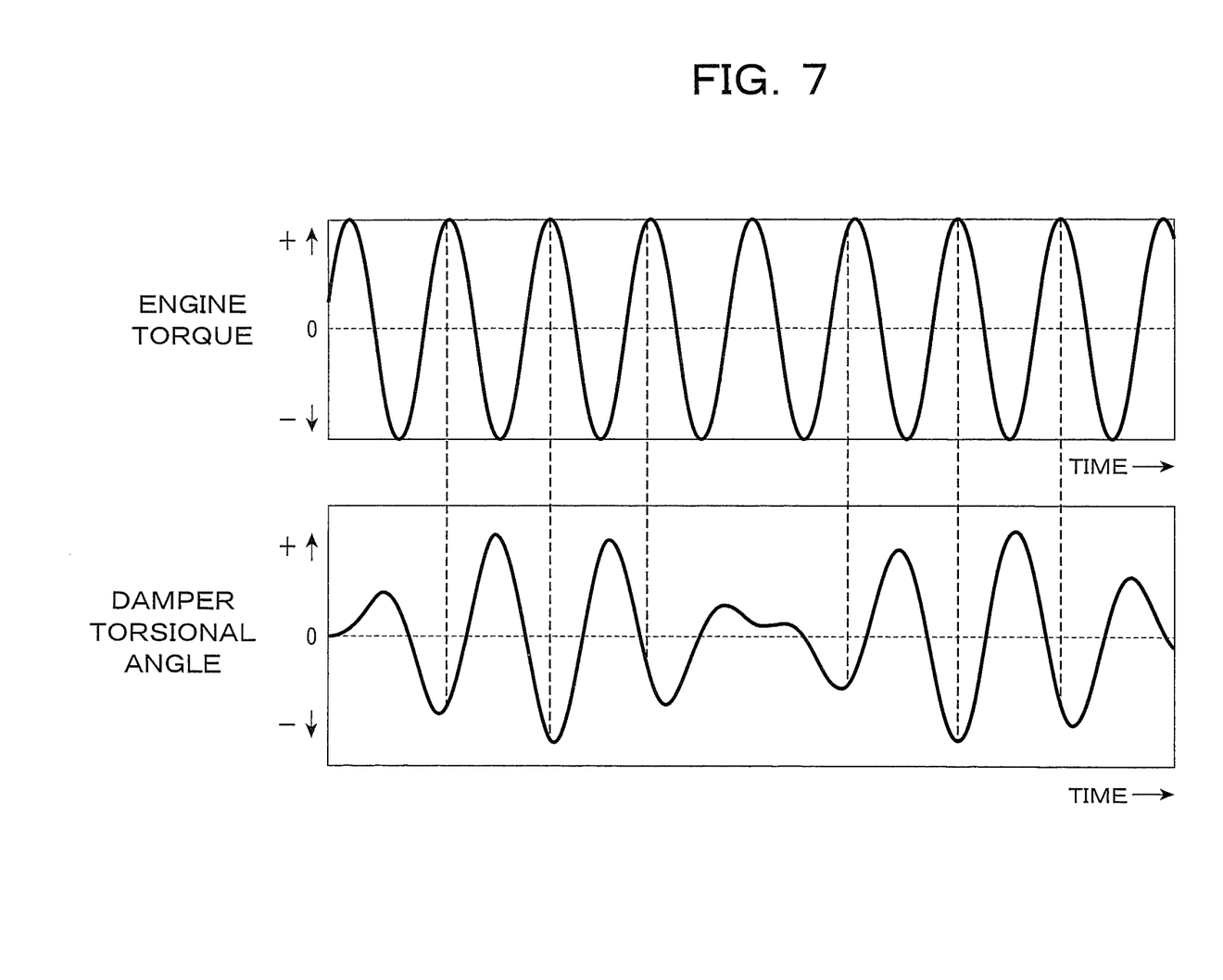
FIG. 7 is a diagram showing an example of phase relation between the torque of engine and the torsional angle of the damper in a situation where frequency of the torque of engine is higher than resonant frequency of the damper.
Figure 8:
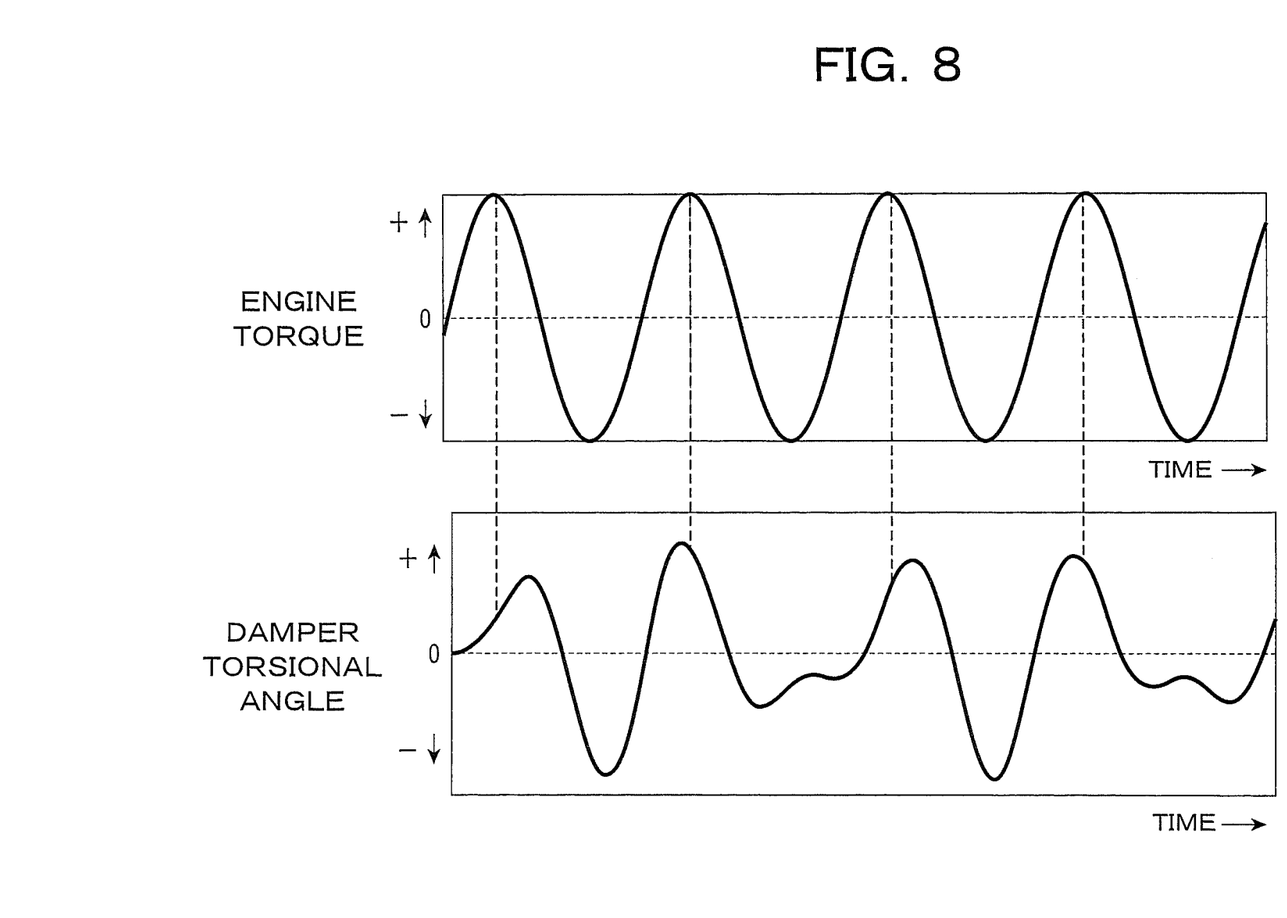
FIG. 8 is a diagram showing an example of phase relation between the torque of engine and the torsional angle of the damper in a situation where frequency of the torque of engine is lower than resonant frequency of the damper.

FIG. 7 shows an example of phase relation between the torque of the engine 11 and the torsional angle α of the damper 14 in a situation where the frequency of the torque of the engine 11, that is, the rotational speed of the engine 11 is higher than the resonant frequency ω0. FIG. 8 shows an example of phase relation between the torque of the engine 11 and the torsional angle α of the damper 14 in a situation where the frequency of the torque of the engine 11 is lower than the resonant frequency ω0. As apparent in FIG. 7, in a case where the frequency of the torque of the engine 11 is higher than the resonant frequency ω0, it is possible to decrease the torsional vibration of the damper 14 by making the negative peak of the torsional angle α coincide with the positive peak of the torque of the engine 11. On the other hand, as apparent in FIG. 8, in a case where the frequency of the torque of the engine 11 is lower than the resonant frequency ω0, it is possible to decrease the torsional vibration of the damper 14 by making the positive peak of the torsional angle α coincide with the positive peak of the torque of the engine 11.

Then, in a case where the last positive peak of the torque occurs in the situation where the rotational speed of the engine 11 is higher than the resonant frequency ω0, the relation between the phase of the torque pulsation of the engine 11 and the phase of the tosional vibration of the damper 14 is controlled such that the negative peak of the torsional angle α of the damper 14 occurs in the expansion stroke. Also in the present embodiment, the phase relation is controlled by controlling the timing to make the first MG 12 output torque when the engine 11 is going to be stopped. Due to this, also in the present invention, the control apparatus 20 executes the control routine shown in FIG. 4. However, in the present invention, the determination range is determined such that the negative peak of the torsional angle α of the damper 14 occurs in the expansion stroke. It is determined depending on various matters of the engine 11 and various matters of the damper 14 whether or not the last positive peak of the torque of the engine 11 occurs in the situation where the rotational speed of the engine 11 is higher than the resonant frequency ω0. Due to this, also in the present invention, the determination range is set as appropriate depending on such matters.

As mentioned above, in the second embodiment, when the engine is going to be stopped, the last positive peak of the torque of the engine 11 occurs in the situation where the rotational speed of the engine 11 is higher than the resonant frequency ω0. Due to this, the timing to make the first MG 12 output torque is controlled such that the negative peak of the torsional angle α of the damper 14 occurs in the expansion stroke. Thereby, it is possible to suppress the torsional vibration of the damper 14. Due to this, it is possible to decrease the vibrations of the crankshaft 11a and the input shaft 15 when the engine is going to be stopped. Further, thereby, it is possible to suppress occurrence of a tooth striking noise caused by the vibration of the gears of the power splitting device 16. Thereby, it is possible to decrease abnormal noises.

As mentioned above, in a case where the last positive peak of the torque of the engine 11 occurs in the situation where the rotational speed of the engine 11 is higher than the resonant frequency ω0, the effect of the torque inputted to the damper 14 occurs on the torsional vibration of the damper 14 in a delayed fashion. Due to this, in the second embodiment, when the positive peak of the torsional angle α of the damper 14 occurs in the expansion stroke, the torsional vibration of the damper 14 is amplified. Then, in the present invention, the timing to make the first MG 12 output torque may be controlled such that the positive peak of the torsional angle α of the damper 14 does not occur in the expansion stroke. Thereby, at least, it is possible to avoid amplifying the torsional vibration of the damper 14. This control may be executed, in a case where the control apparatus 20 failed to control the timing to make the first MG 12 output torque such that the negative peak of the torsional angle α of the damper 14 occurs in the expansion stroke.

The present invention is not limited to the above mentioned embodiments, and can be executed in various embodiments. For example, the number of cylinders of the internal combustion engine where the present invention is applied is not limited to four. The present invention may be also applied to a two-cylinder internal combustion engine or a three-cylinder internal combustion engine. Further, the present invention may be applied to an internal combustion engine having five or more cylinders.

The invention claimed is:

1. A stop control apparatus applied to an internal combustion engine, a crankshaft of the internal combustion engine being connected to a rotational member via a torsional damper, wherein
when a direction in which the crankshaft rotates while the internal combustion engine is in operation is assumed to be a positively rotating direction, a state of torque applied to the crankshaft in the positively rotating direction in which the crankshaft rotates is assumed to be positive, and a state of a torsional angle of the torsional damper in a state of the crankshaft advancing in the positively rotating direction with respect to the rotational member is assumed to be positive, a last positive peak of torque of the internal combustion engine occurs when the internal combustion engine is going to be stopped occurs in a situation where a rotational frequency of the internal combustion engine is lower than resonant frequency of the torsional damper, and the stop control apparatus comprises: an electric motor which is capable of outputting torque to the crankshaft; and a computer executing a computer program to function as a stop device which is configured to execute a stop control to make the electric motor output the torque such that the crankshaft decelerates, in a case where a predetermined engine stop condition is satisfied, wherein the stop device is configured by the computer executing the computer program to stop the crankshaft and thereby set a positive peak of the torsional angle of the torsional damper to occur at a moment of a peak of torque of the internal combustion engine in each expansion stroke of the internal combustion engine.

2. A stop control apparatus applied to an internal combustion engine, a crankshaft of the internal combustion engine being connected to a rotational member via a torsional damper, wherein when a direction in which the crankshaft rotates while the internal combustion engine is in operation is assumed to be a positively rotating direction, a state of torque applied to the crank shaft in the positively rotating direction in which the crankshaft rotates is assumed to be positive, and a state of a torsional angle of the torsional damper in a state of the crankshaft advancing in the positively rotating direction with respect to the rotational member is assumed to be positive, a last positive peak of torque of the internal combustion engine occurs when the internal combustion engine is going to be stopped occurs in a situation where a rotational frequency of the internal combustion engine is higher than resonant frequency of the torsional damper, and the stop control apparatus comprises: an electric motor which is capable of outputting torque to the crankshaft; and a computer executing a computer program to function as a stop device which is configured to execute a stop control to make the electric motor output the torque such that the crankshaft decelerates, in a case where a predetermined engine stop condition is satisfied, wherein the stop device is configured by the computer executing the computer program to stop the crankshaft and thereby set a negative peak of the torsional angle of the torsional damper to occur at a moment of a peak of torque of the internal combustion engine in each expansion stroke of the internal combustion engine.

3. The stop control apparatus according to claim 1, wherein the stop device is configured by the computer executing the computer program to start the stop control in a case where the rotational speed of the internal combustion engine is a predetermined determination rotational speed or lower and also a crank angle of the internal combustion engine is within a predetermined determination range.

* * * * *